United States Patent [19]

Hirt

[11] Patent Number: 4,959,668

[45] Date of Patent: Sep. 25, 1990

[54] DEVICE FOR PRODUCING IMAGES ON PRINTING IMAGE CARRIERS

[75] Inventor: Alfred Hirt, München, Fed. Rep. of Germany

[73] Assignee: MAN Technologie GmbH, München, Fed. Rep. of Germany

[21] Appl. No.: 266,167

[22] Filed: Nov. 2, 1988

[30] Foreign Application Priority Data

Nov. 26, 1987 [DE] Fed. Rep. of Germany ....... 3740079

[51] Int. Cl.$^5$ ............................................. G01N 15/00
[52] U.S. Cl. .................................. 346/155; 346/139 C
[58] Field of Search .................... 346/150, 153.1, 155, 346/139 C

[56] References Cited

U.S. PATENT DOCUMENTS 3,090,828  5/1963  Baia ..................................... 346/155

Primary Examiner—Arthur G. Evans
Attorney, Agent, or Firm—Ladas & Parry

[57] ABSTRACT

The invention proposes an electrical image producing device for use with printing image carriers of printing presses. The main components of the device are writing units designed in the form of electrodes which are able to be activated individually in accordance with the image to be produced by connection with a power supply. In the case of a purely electrical form of the device the writing units consist of a stylus which is able to be connected with the power supply via a photoconductor. For driving the stylus use is made of a light guide on which there is a magneto-optic light switching module controlled by current pulses. In one switched state the light switching module allows the passage of a light ray from a light source through the light guide, the light ray passing through the photoconductor and making it locally electrically conducting. In this manner an electric potential is produced at the stylus which cooperates with a counter electrode so as to produce an electric field modifying the printing image carrier.

25 Claims, 6 Drawing Sheets

| | | |
|---|---|---|
| 1<br>5<br>9<br>13 | 1  5  9  13<br>  3  7  11<br> 2  6  10<br>   4  8  12 | ...<br>...<br>...<br>... |
| 2<br>6<br>10<br>14 | 1  5  9  13<br>  3  7  11<br> 2  6  10<br>   4  8  12 | 1. |
| ⋮ | | |
| 5<br>9<br>13<br>17 | 1  5  9  13<br>  3  7  11<br> 2  6  10<br>   4  8  12 | 4. |
| ⋮ | | |
| 13<br>17<br>21<br>25 | 1  5  9  13<br>  3  7  11<br> 2  6  10<br>   4  8  12 | 13 |
| 14<br>18<br>22<br>26 | 1  5  9  13<br>  3  7  11<br> 2  6  10<br>   4  8  12 | 14 |
| ⋮ | | |
| 5599<br>5603<br>5607<br>5611 | 1  5  9  13<br>  3  7  11<br> 2  6  10<br>   4  8  12 | 5599 |
| 5600<br>5604<br>5608<br>5612 | 1  5  9  13<br>  3  7  11<br> 2  6  10<br>   4  8  12 | 5600 |

Fig. 9

DEVICE FOR PRODUCING IMAGES ON PRINTING IMAGE CARRIERS

BACKGROUND OF THE INVENTION

The invention relates to a device for producing an image on a printed image carrier comprising at least one writing unit designed in the form of an electrode for locally influencing a printing press printing image carrier in the form of halftone dots, said writing unit or units being adapted to be connected with a source of electrical power and to be operated in accordance with the image to be produced on the printing image carrier.

So-called erasable printing image carriers or plates have been proposed, which when mounted in the printing press may be used more than once, since the printing image produced on the carrier may be erased by heat, an electric current or the like so that the printing image carrier may then have a new image produced thereon by corresponding forms of energy.

The German patent No. 3,633,758 describes an example of such a system, in which the printing image carrier is made of a ferroelectric material and is able to be locally polarized to different extents so that the ability to be wetted by the printing ink is varied. For the operation of reversing polarity use may for instance be made of electrodes of which the one electrode is designed in the form of a stylus may be operated in accordance with the image to be transferred onto the printing image carrier, that is to say it may have an electric current applied to it for a short time. The second electrode has the printing image carrier mounted thereon.

A further system with erasable printing image carriers is described in German patent No. 3,705,439. In this case, the printing image carrier is made of an electrically conductive polymer which is able to be influenced electrochemically. In this case as well a careful design of the image transfer device is needed to produce electrical fields which are dot-like in cross section and have precise limits, for influencing the printing image carrier.

The problem occurring in the realization of such image transfer devices is that the switching over between current flowing and no current flowing and vice versa has to be carried out in very short time in order to comply with the requirements of higly sophisticated printing presses.

SUMMARY OF THE PRESENT INVENTION

Accordingly one object of the present invention is to provide a device for producing an image on an image carrier of a printing press of the initially described type which makes possible rapid operation.

A further object of the invention is to provide such a device which makes possible maximum precision in writing on the printing image carrier.

In order to achieve these or other objects appearing from the present specification, claims and drawings, the writing unit or units comprise styluses which are able to be connected via a photoconductor with a source of current and for a local and timed influence on the photoconductor and thus for operation of the stylus a punctuate radiation source, as for instance a source of light, is provided, whose beam is associated with a stylus and may be directed through the photoconductor.

A writing unit is thus a stylus provided with a tip. The latter is optically operated for producing a field with a punctuate cross section by locally irradiating the photoconductor with light pulses. The irradiated spot on the photoconductor becomes electrically conducting, such conductivity depending on the intensity of the light shining on the photoconductor. Thus the potential derived from the source of current is changed for the stylus. It is in this manner that it is not only possible to provide for operation of the styluses in a manner that is exactly timed but furthermore for one which is quantitatively variable. For influencing the photoconductor any type of radiation may be used, but however for reasons of cost light is preferred which may be produced with the simplest equipment.

The different electrical fields able to be produced at the styluses make it possible to produce different gray tones on the treated printing image carrier which then appear when a print is produced.

The use of punctuate light rays to influence the photoconductor is preferably by way of light guides, this offering the advantage that within a confined space numerous and mutually defined light rays may be caused to act on the photoconductor.

Using a combination of several separately operated light guides it is possible in a simple way to vary the intensity of the light which is directed onto the photoconductor if for a given dot the light is supplied by one or more light guides in accordance with the desired intensity. In this case each stylus unit is provided with several styluses, as for instance 4 to 6, which are arranged between the photoconductor and a common light source. The number of light guides, which may be associated with one stylus, is limited but nevertheless the spectrum of light intensities or gray tones may be enhanced if the light guides associated with one stylus supply light with different intensities. By different combinations of the light guides used it is then possible to produce different gray tones.

In accordance with a further form of the invention the light source is controlled using a magneto-optic light switching module.

Magneto-optic light switching modules, which are available under the name "LISA" (light switching array), comprise punctuate light switching cells, which independently of each other may be thermomagnetically switched between a light conducting and an opaque condition. The manner of operation is based on the fact that a monocrystalline layer of an iron bismuth garnet on a gadolinium gallium garnet substrate may be spontaneously magnetized so that the plane of light polarization is twisted. On the basis of certain crystal properites it is possible for the LISA elements to assume only two stable conditions, which are used to switch the light source on and off.

The switching operation for the operation of a stylus then takes place in a completely contactless manner, voltages of the other of kV being able to be switched at the clocking frequencies in a range of $10^{-5}$ to $10^{-6}$ as desired for printing presses. Using conventional electronic switching components such a switching frequency is very difficult to achieve in a kV range.

The light switching modules are preferably placed on the light guides, i.e. so as to connected to two parts of their length. They are operated with time pulses in order to cause a light pulse to pass from the light source via the respective light guide to the photoconductor. In this manner it is possible for the switching operations to only last a few $\mu$s.

The switching modules may be simultaneously used as light collectors in order to channel light rays from a number of light guides into a single guide. This possibility offers a simple construction for channeling different light intensities into different light guides, which are associated with a single stylus in order in this manner to provide a plurality of gray tones for printing.

In accordance with a further development of the invention a plurality of styluses in at least one row are connected via a common photoconductor with a common voltage power source. One row of styluses extends over the breadth of the printing image carrier so that by operation of the styluses in accordance with a halftone screen pattern it is possible for image data to be fed over the full breadth of the printing image carrier without having to move the styluses mechanically, while feed of the light to the printing image carrier along the length or circumference thereof is due to the movement of the printing image carrier itself. This makes possible rapid feed of the image data to the printing image carrier.

If the distance apart of the tips of the styluses may not be made to correspond to the desired distance between dots in the haftone screen pattern, at least two rows of styluses are established so that the styluses in one row are opposite gaps between styluses in the other row and the dots in a line are produced sequentially. In such cases it is necessary for the matrixed image dots to be re-sorted and stored.

In the case of applications in which ion transport is necessary for the electrical influencing of a printing image carrier, a further proposal of the invention provides a stylus, which consists of a control electrode and an intermediate electrode cooperating with the control electrode so as to form a field, such intermediate electrode being at least partly swilled with an electrolyte.

The control electrode and the counter electrode bearing the printing image carrier are responsible for the transport of ions. Between these two electrodes there is a field forming intermediate electrode which prevents a transverse current between the electrodes properly so called. Such a transverse current could spread onto adjacent dots of the halftone screen and then interfere with their gray tone.

In accordance with one form of the invention the field forming intermediate electrode is in the form of a bell and is provided with a concentric hole in its floor for the electrolyte to flow through to the printing image carrier.

This simple form of the intermediate electrode sufficiently limits the punctuate cross section of the ion current and furthermore makes possible a continual exchange of the electrolyte layer at the surface of the printing image carrier in a simple manner. This exchange has the effect of making it possible to avoid polarization phenomena in the electrolyte due to the continual exchange.

The maximum halftone screen size is defined by the opening of the intermediate electrode, it being assumed that the distance between the field forming intermediate electrode and the printing image carrier is preset and remains constant.

In this case as well the control electrode may be operated optically using light conducted by a light guide, the precise design being selected from one of those already described.

Owing to the low electrical switching voltage it is also possible to utilize simple switching components for the electrochemical effect, as for example integrated bistable switching elements which are driven by CCD shift registers. Such systems are used for instance in broad thermoprinting heads and thermowriting devices.

In both cases gray tones may be produced by using different ionic currents.

Preferably a plurality of writing or stylus units, that is to say pairs of control electrodes and intermediate electrodes, are used which are collected together in a subassembly and supplied from one source of electrolyte. Owing to the minimum overall size of the writing units it is advantageous in this case as well if the units are arrayed in a series of rows with an offset between them of half the pitch in order to make possible the production of the image on the image carrier without displacement of the image producing means mechanically.

The invention will now be described on the basis of the working embodiments thereof shown in the diagrammatic drawings.

BRIEF DESCRIPTION OF THE SEVERAL VIEWS OF THE FIGURES

FIG. 9 is a diagram of the operation of the styluses to produce an image.

DETAILED DESCRIPTION OF WORKING EXAMPLES OF THE INVENTION

Figure 1:
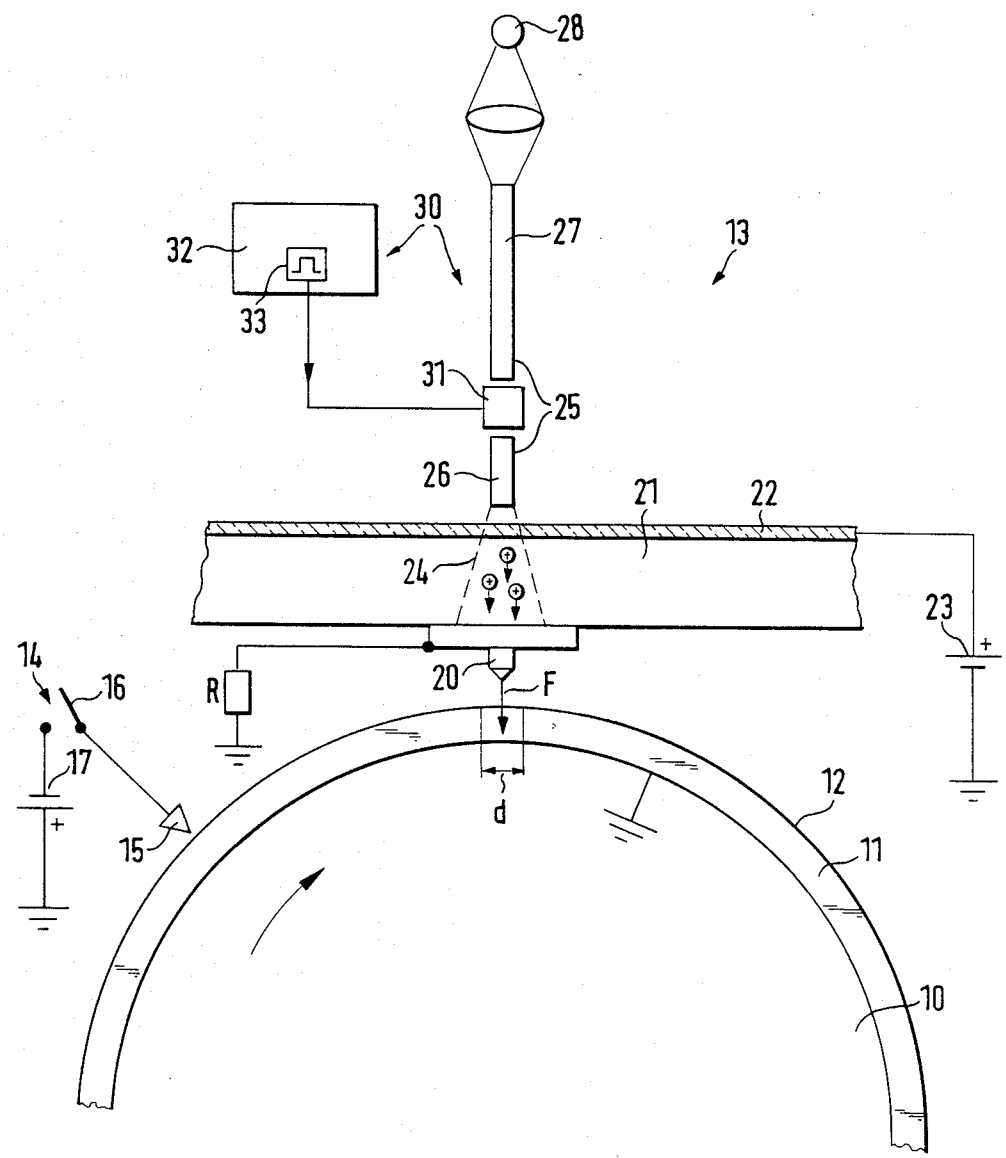
FIG. 1 shows a first embodiment of the invention.

FIG. 1 shows the plate cylinder 10 of a printing press with a printing plate 11, i.e. a printing image carrier, mounted thereon. The wettability of the surface 12 of the printing image carrier by printing ink may be influenced by an electric field F. In order to produce electric fields F in the desired manner, there is an image producing or writing device 13, with which the wettability of the surface 12 of the printing image carrier 11 may be locally changed or otherwise affected in accordance with an image to be printed.

For the printing image carrier 11 there is an erasing or deleting device 14 with a design dependent on the type of printing image carrier. In the case of a printing image carrier 11 made of ferromagnetic material the erasing device 14 may for example be in the form of a linear electrode 15, whose length is the same as the length of the plate cylinder 10 or, respectively, the printing image carrier 11 placed thereon and which may be connected by means of a switch 16 with a suitable voltage 17. During the erasing operation the electric field between the linear electrode 15 and the plate cylinder 10 forming the other electrode causes the surface 12 of the plate 11 to be uniformly polarized during one complete revolution of the plate cylinder 10. It is then possible to use the image producing device 13 to repolarize certain areas so that the surface energy of the plate 11 is locally modified in accordance with the image which is to be printed. These different zones are characterized by different wettabilities with respect to polar liquids (such as water) and non-polar ones (such as printing ink).

Constructional features of the printing image carrier printing, the plate and nor the erasing device are not part of the invention but rather part of the environment in which it is used so that they are not described in detail here.

The image producing means 13 comprises a stylus 20, whose tip is directed towards the surface 12 of the printing image carrier 11. The stylus 20 is connected via a photoconductor 21 with an optically transparent electrode 22, which is permanently connected with a power source supply 23. The stylus 20 is furthermore provided with a light guide 25, which consists of a first section 26 directed towards the optically transparent electrode 22 and a second section 27, which at least during the process of forming an image is constantly connected with the source 28 of light.

The photoconductor 21 is provided with a controller 30 with which the light ray from a second light guide section 27 may be coupled with the first light guide section 26 for a short time. These light pulses pass through the optically transparent electrode 22 and the photoconductor 21. The photoconductor 21 becomes electrically conducting at this point so that at the stylus there will be a potential which is dependent on the conductivity or the light intensity. Between the tip of the stylus 20 a field F becomes established in cooperation with the counter electrode 10, such field causing repolarization of the punctuate zone of the printing image carrier 11 traversed by the electrical field. The diameter d of the electric field and the part of the printing image carrier influenced thereby depends on the voltage applied, which in turn depends on the incoming light intensity. The stylus 20 is provided with a resistor R in order to ensure not only the division of the voltage but also a rapid drain of the charge of the stylus 20 after turning off of the light into the photoconductor 21.

The operating device consists of a magneto-optic switching module 31 (or LISA element), which is driven by electronic circuitry 32. By a first current pulse with a duration of a few μs and a further current pulse of similar short duration the LISA element is switched into a light conducting condition and then back again into an opaque condition. The production of a printing dot on the printing image carrier 11 may thus be carried out in a few μs., i.e. approximately 25 μs.

The reading of the image dots by the electronic circuity 32 and the production of the current pulses 33 by means of such encoded image data may take place in accordance with known methods.

It is also possible in principle equip the image producing device 13 with a single stylus 20. For production of a new image it is then necessary to provide a compound motion preformed by the image producing device 13, which is able to shift along a line, and a line feed, which is performed by the plate cylinder 10. Such a design would however generally not meet the requirements of modern printing presses. As a rule the image producing device is to be equipped with a plurality of stylus units or styluses 20, which are able to be operated simultaneously or matrixwise in order in this manner not only to substantially save time but also to achieve a simplification of the system as a whole inasmuch as less mechanical motions have to be performed.

Figure 2:
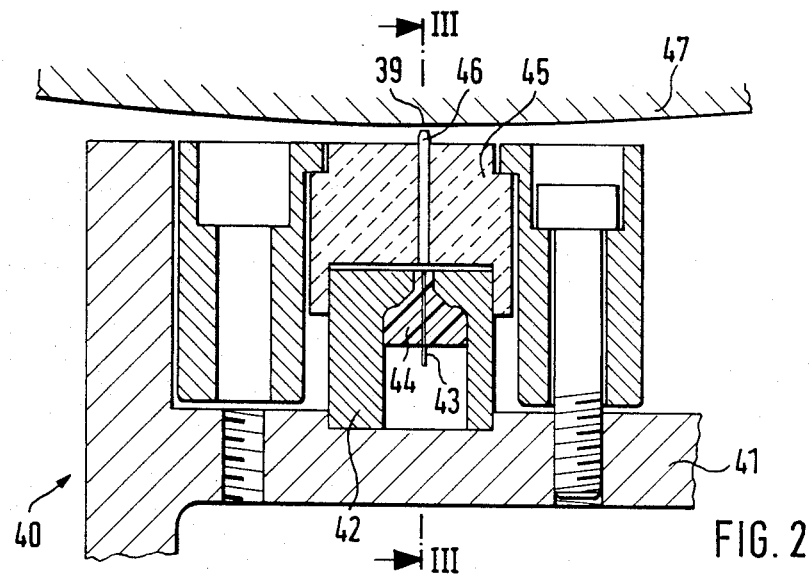
FIG. 2 is a section taken through one of the styluses shown in FIG. 1 on a larger scale.
Figure 3:
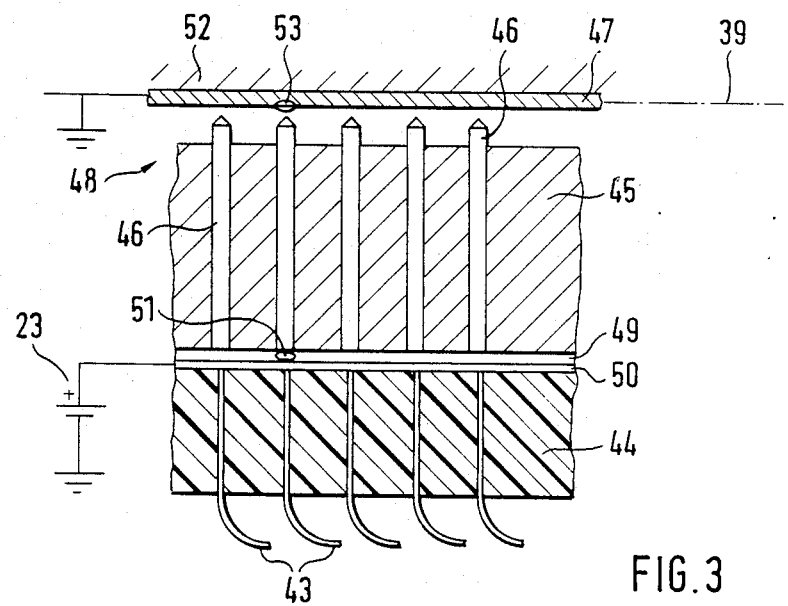
FIG. 3 is a section taken on the line III—III in FIG. 2.

FIGS. 2 and 3 show a design with a plurality of styluses 46 arranged in row 48, as seen in transverse and longitudinal section, respectively.

In FIG. 2 a part of a stylus head 40 carrying the row of styluses will be seen, which consists of a carrier 41 with a light rail 42 attached thereto. The light rail 42 carries a row of light guides 43, which are fixed in the light rail 42 by means of casting resin 44. Furthermore a stylus carrier 45 is attached to the light rail 42. This carrier consists of an electrically insulating material as for instance glass ceramic material, and carries the styluses 46. The stylus head 40 is so arranged that the styluses 46 are located along a line 39 on the plate cylinder or of the printing image carrier 47, the tips of the styluses 46 being placed with a small clearance of under 1 mm from the printing image carrier 47.

FIG. 3 is a section taken along line III—III FIG. 2 along the row 48 of styluses. As made clear by FIG. 3, between the light rail 42 and, respectively, the casting resin 44 on the one hand and the carrier 45 on the other there is an intermediate layer, at least in the vicinity of the styluses 46, such layer consisting of a photoconductor 49 and an electrode 50. The photoconductor 49 makes a contact connection with the styluses 46, while the adjacent transparent electrode 50 is on the light rail side. The electrode 50 is connected with a high voltage supply 23. The photoconductors 43 each have a control or drive unit, not shown, as described for instance in connection with FIG. 1 and receive light from a common light source that is not shown either. Individual operation of the photoconductors causes the styluses 46 to be individually operated or activated.

If for instance the second light guide 43 from the left in FIG. 3 provides a light ray the illuminated part 49 of the photoconductor 51 will become electrically conductive and thus the second stylus 46 from the left will be connected with the high voltage supply 23 via the electrode 50. In cooperation with the counter electrode 52 an electric field is produced between the stylus tip and the printing image carrier 47 which modifies the wettability of the printing image carrier 47 in the zone 53.

The size of the zone 53 or, respectively, the radius of the screen dot on the surface of the printing image carrier 47, which ultimately determines the gray tone of the image to be printed at this part depends on the individually applied electric field. By modifying the tip voltage it is thus possible to positively vary the size of the halftone dot to be produced. Since the voltage of the stylus tip 46 depends on the conductivity of the photoconductor and the latter depends on the intensity of the input light, the gray tones may be altered by varying the light intensity.

Figure 4:
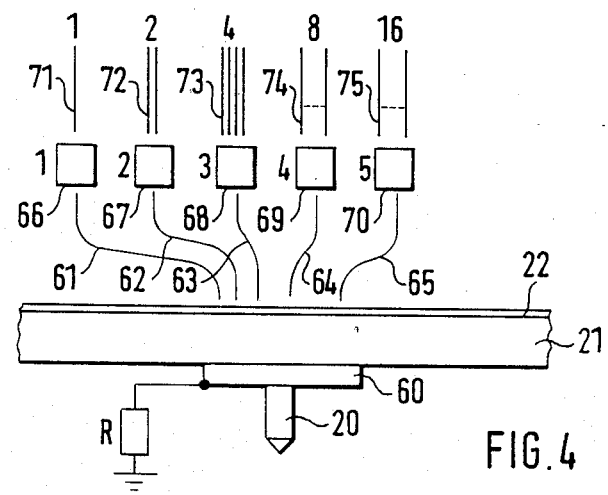
FIG. 4 is a diagrammatic view of the arrangement using light guides for conducting light with different intensities to the photoconductor.

FIG. 4 shows an example in which light guides for light at different intensities are connected with the photoconductor. The arrangement involves the use of light guides of which more than one is connected with the same stylus, such light guides being able to be separately controlled so that they deliver different light intensities.

FIG. 4 shows a simple view with one stylus 20 of an image producing device as in FIG. 1. In order to increase the contact area on the photoconductor the stylus 20 is provided with a broadened out circuit board 60. The stylus 20 is associated with five light guides 61 to 65, which are each equipped with a light switching module 66 to 70. Each light guide 61 to 65 is furthermore associated with a different number of connecting guides 71 to 75, which conduct the light rays from a light source, not shown, to the respective light switching module 66 to 70. Thus for instance the light guide 61 is associated with one connecting guide, the light guide 62 is associated with two connecting guides 72, the light guide 63 is connected with four connecting guides 73, the light guide 64 is connected with eight connecting guides 74 and the light guide 65 is associated with sixteen connecting guides 75. By switching on one or more of the light switching modules 66 to 70 it is possible to directly light with 32 different intensities on the photoconductor 21 in FIG. 4 and thus produce 32 different resistance stages. The radius or gray tone of the respective halftone dot is set accordingly. Each stylus 20 of an image producing device is associated with the above number of light guides 61 to 65 and 71 to 75.

The light guides are placed opposite the respective styluses in the illustrated forms of the invention. This array is not absolutely essential. If it is appropriate for reasons of convenience of manufacture or because of the space available, the light guides and the styluses may be offset in relation to each other. In this case the gaps due to the offset will be spanned by printed wiring which takes the place of the circuit boards 60. The printed wiring will thus produce the electrical contact between the conducting part of the photoconductor and the respective stylus.

Figure 5:
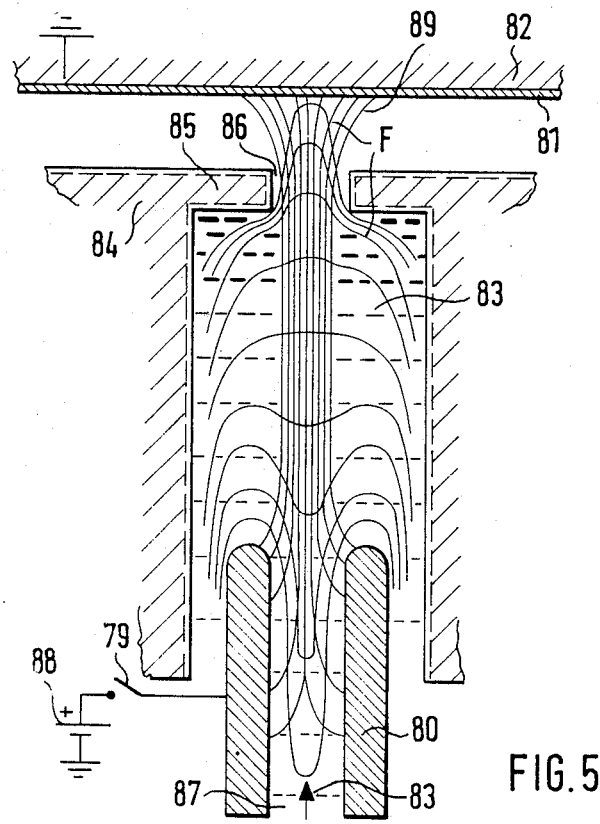
FIG. 5 shows a further possible design of a stylus for an electrochemically functioning image producing device forming a second embodiment of the invention.
Figure 6:
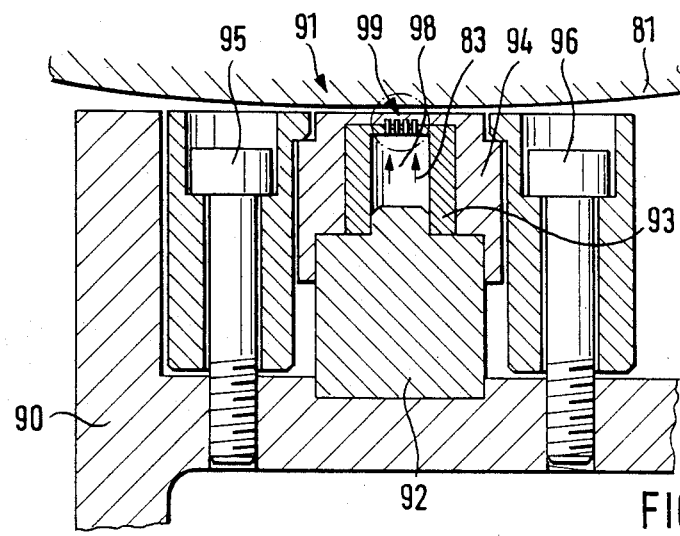
FIG. 6 shows one of such styluses arranged in four rows.
Figure 7:
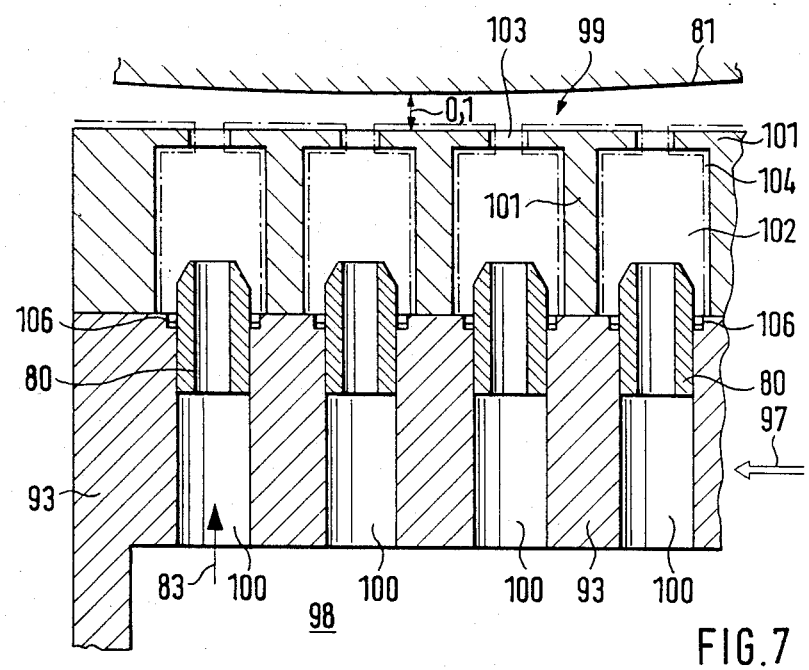
FIG. 7 is a section taken through four such styluses.

FIGS. 5 through 7 represent a further working example of the invention which make it possible to cause changes in the printing image carrier electrochemically.

FIG. 5 shows one possible design of a stylus for an electrochemically operating image producing device. The stylus unit has a first sleeve-like control electrode 80, which is connected to a power supply 88 and which cooperates with a counter electrode 82 carrying the printing image carrier 81 in forming an electric field F, with which an ion current 89 is produced in an electrolyte 83, which is located in the part between the first control electrode 80 and the counter electrode 82.

With a stylus unit having only one electrode 80 the halftone dot produced in the form of the part modified by the ion current 89 on the printing image carrier 8 would consist of a dark core with a gray tone decreasing in density towards the outside, and dependent on the size of this core a different gray tone would be carried over to the adjacent halftone dots. In order to prevent this smearing of the gray tone onto the adjacent dots an intermediate electrode 84 is provided which determines the ion current path 89. The intermediate electrode 84, see FIG. 5, consists of a bell-like, electrically insulating structure, which surrounds at least the tip of the control electrode 80 and whose floor 85 has a central aperture 86 so that it forms a diaphragm. This diaphragm 85 and 86 of the intermediate electrode 84 serves as a field forming element. It is a constant distance from the control electrode 80 and determines the configuration of the field F and thus the current distribution. The diaphragm 85 and 86 of the field forming intermediate electrode 84 is arranged at a small distance of the order of 0.1 mm from the shaped cylinder or control electrode 82.

The central aperture 87 of the control electrode 80 serves for the supply of electrolyte 83. A continual replacement of the electrolyte layer on the surface of the printing image carrier 81 contributes to avoiding polarization phenomena in the electrolyte.

One design of the image producing means with four rows of stylus units as shown in FIG. 5 is to be seen in cross section in FIG. 6. On a carrier 90, which is only shown in part, there is an image producing device 91 consisting of a distributor 92 for the electrolyte, an electrode carrier 93 and a stylus rail 94, which is secured by screws 95 and 96. The electrode carrier 93 defines an electrolyte duct 98 and carries four rows of stylus units 99, which are shown on a larger scale in FIG. 7.

The electrode carrier 93 is designed with such a breadth that four stylus units may be located thereon side by side, while the length of the electrode carrier is the same as the breadth of the printing image carrier 81. At the head and the electrode carrier 93 is provided with holes 100 distributed in the form of a matrix, such holes allowing the flow of the electrolyte 83 to the individual stylus units and which respectively accommodate a sleeve-like control electrode 80. The field forming intermediate electrode 101 is also designed in the form of a block and is provided with holes 102 and 103 associated with the respective control electrode 80 so that the electrolyte, after emerging from the respective control electrode 80, may pass to the printing image carrier 81. For the individual control of the control electrodes 80 there is printed wiring 106 making electrical contact with the control electrodes 80. The intermediate electrode 101 may be made of an electrically conducting material, as for instance a metal; in this case it is then coated with an electrically insulating layer 104, as for instance a coating in the form of an oxide. Using conventional pump means the electrolyte 83 is caused to move through the ducts 100, 102 and 103 to the stylus units 99.

The representation of the image information on the printing image carrier 81 is caused by connecting the respective control electrodes 80 with the power supply 88, this resulting in ion transport at the respective stylus units so that halftone dots are produced by the electrochemical modification of the surface of the printing image carrier 81. By reversing the flow of current the modification may be cancelled so that the printing image carrier 81 is available for the production of a new image thereon.

Owing to the low current densities of the order of 10 mA/cm$^2$ required for this image producing device it is possible to use integrated bistable switching elements 79 for the control electrodes, which are driven with shift registers. In this respect known designs may be utilized. Driving by means of LISA elements and light guides as described for the above working example, is also possible here as a matter of principle, but such a driving device would be elaborate owing to the low electrical switching voltages.

In order to achieve a rapid recordal of the image data on a printing image carrier using one or the other method of image production, preferance will be given to an image producing device in which each line is equipped with stylus units and there is a stylus unit for each halftone dot so that the printing image carrier may have the image produced thereon directly line by line.

However because the stylus units have to have a certain minimum size, this in not always feasible. In the case of a purely electrical image producing system it may not be feasible because of the high electrical field strengths. As a rule there has to be a certain minimum clearance between the stylus tips of the stylus units. To take this into account the halftone dots, or rather the stylus units producing them may be placed in more than one row with an offset of half the pitch between one row and the next so that although the halftone dots of one line are only completed after the printing image carrier has moved a number of steps, discrete halftone dots are produced simultaneously. In this manner a printing image carrier may have the full image produced thereon in a single pass.

Figure 8:
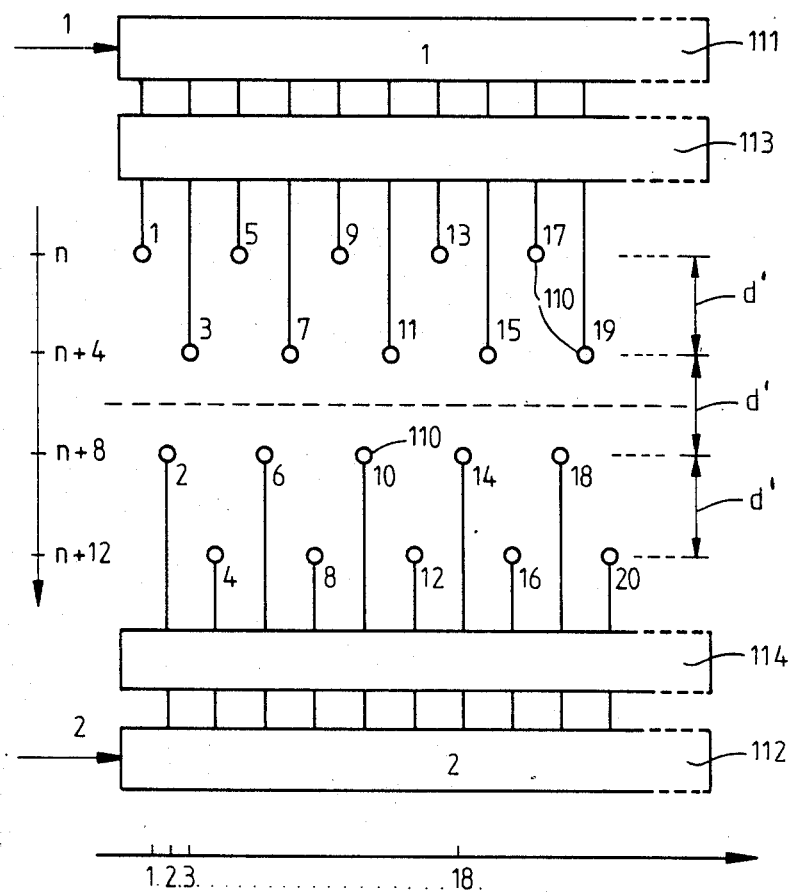
FIG. 8 is block diagram of the circuit of the device.

FIG. 8 shows such an arrangement diagrammatically, in which the positions 110 of the stylus units, i.e. of the stylus tips, are indicated by circles, in an image producing device, the associated number 1 . . . 20 representing the halftone dots in the line direction. The stylus units are placed in four lines n, n+4, n+8 and n+12, which are respectively separated by three "blanks" and have a distance d' between each other. The association between the stylus units and the halftone dots 1, 2, 3, 4 . . . alternates from line to line.

The supply of the data to the styluses takes place as described above. Via the shift registers 111 and 112 and dependent on the use of two current and, respectively, voltage switches 113 and 114 the stylus units are driven in accordance with the image to be produced and in accordance with their arrangement 110. In this respect at the commencement of the image producing operation in the first line on the printing image carrier the halftone dots 3, 7, 11 etc. produced, in the fifth line the halftone dots 3, 7, 11 etc., in the ninth line the halftone dots 2, 6 etc. and in the thirteenth line the dots 4, 8, 12, 16, 20 etc. are produced. The production of these halftone dots is indicated in the first section in FIG. 9.

Feed by one line then takes place so that the lines 2, 6, 10 and 14 may have the dots producted in them in a similar manner. After feed by four lines, the thirteenth line, in which the halftone dots 4, 8, 12 etc. have been produced, is supplemented with the halftone dots 2, 6, 10, 14, etc. In the eight line feed (not shown in FIG. 9) the thirteenth line has the further halftone dots 3, 7, 11 etc. marked in it in order finally to complete the thirteenth line in the twelfth line feed step. Thus all the lines are completed in steps in one pass.

This driving and processing of the dot information makes it necessary for the image data to be intermediately stored in an order in which the data are transferred by the respective image producing device to the printing image carrier.

I claim:

1. An electric image producing device for use in conjunction with a printing image carrier of a printing press comprising at least one writing unit, in the form of an electrode means, for modifying said printing image carrier in a local and punctuate manner, said at least one writing unit being adapted to be connected with an electrical power supply and including means for driving it in accordance with an image on said printing image carrier, said printing image carrier being able to be modified electrochemically and said writing unit comprising a control electrode and a field forming intermediate electrode, which are same being at partly immersed in an electrolyte.

2. The device as claimed in claim 1 wherein said field forming electrode is in the form of a bell with a floor having a central aperture for forming a diaphragm through which said electrolyte may flow onto the printing image carrier.

3. The device as claimed in claim 1 comprising a plurality of said control electrodes and said intermediate electrodes, the same being arranged in a plurality of pairs with one control electrode and one intermediate electrode in each pair and such pairs being arranged in at least one row with a common carrier for the same.

4. The device as claimed in claim 3 wherein the pairs of control and intermediate electrodes are arranged in at least two rows with an offset from row to row of half the pitch in one of the rows.

5. An electric image producing device for a printing image carrier of a printing press comprising at least one writing unit, including an electrode, for modifying a printing image carrier in a local and punctuate manner, an electrical power supply for said writing unit, said writing unit further including a stylus, a photoconductor for connecting said stylus with the electrical power supply via said electrode, a punctuate light source associated with said stylus and positioned for modifying the photoconductor in a locally restricted, timed manner to establish an electrical connection between said electrode and said stylus, and switch means between the light source and the photoconductor for selectively controlling the passage of light from said light source to said photoconductor in accordance with the image to be produced on said printing image carrier.

6. The device as claimed in claim 5 comprising a light guide for directing light from the light source onto the photoconductor via said switch means.

7. The device as claimed in claim 6 comprising a plurality of separate light guides for said stylus.

8. The device as claimed in claim 5 wherein said switch means comprises a magneto-optic light switching module.

9. The device as claimed in claim 8 comprising a light guide for directing light from said light source onto the photoconductor via said magneto-optic light switching module, said light guide including a first portion between the light source and said module and a second portion between the module and the photoconductor such that light can pass through said first portion, then through said module when said switch means is open and thereafter through said second portion.

10. The device as claimed in claim 9 wherein a plurality of said styluses are provided, each stylus being associated with a different number of respective light guides connecting the stylus with said light source, each light guide having a respective magneto-optic light switching module associated therewith.

11. The device as claimed in claim 5 wherein a plurality of said styluses are provided in an arrangement of at least one row, said photoconductor and said electrode being connected in common to all of said styluses, said electrode being transparent to the light from said light source.

12. The device as claimed in claim 11 wherein said photoconductor comprises a layer to which said plurality of styluses are connected.

13. The device as claimed in claim 5 wherein the printing image carrier comprises a ferroelectric layer.

14. The device as claimed in claim 5 wherein said photoconductor and said electrode are in the form of layers between said stylus and said light source.

15. The combination comprising a plate member of a printing press, a printing image carrier mounted on said plate member, said printing image carrier having a surface wettable by printing ink to form an image which can be printed on a substrate, and an electric image producing means for producing a selective electric field on said surface of the printing image carrier for affecting the wettability of said surface in accordance with the image to be printed, said electric image producing means comprising at least one writing unit, including an electrode, for modifying said printing image carrier in a local and punctuate manner, said at least one writing unit being adapted to be connected with an electrical power supply and further including means for operating said unit in accordance with the image to be produced on said printing image carrier, said writing unit comprising a stylus, photoconductor means for selectively and controllably connecting said stylus with the electrical power supply, and a punctuate light source for operating the stylus and for modifying the photoconductor means in a locally restricted, timed manner, the light from said light source being associated with said stylus and being able to be directed to the photoconductor means.

16. The combination as claimed in claim 15 comprising switch means between the light source and the photoconductor means for selectively controlling the passage of light from said light source to said photoconductor means in accordance with the image to be produced on said printing image carrier.

17. The combination as claimed in claim 16 comprising a light guide for directing light from the light source onto the photoconductor means via said switch means.

18. The combination as claimed in claim 17 comprising a plurality of separate light guides for said stylus.

19. The combination as claimed in claim 15 wherein said switch means comprises a magneto-optic light switching module.

20. The combination as claimed in claim 19 comprising a light guide for directing light from said light source onto the photoconductor means via said magneto-optic light switching module said light guide including a first portion between the light source and said module and a second portion between the module and the photoconductor means such that light can pass through said first portion, then through said module when said switch means is open and thereafter through said second portion.

21. The combination as claimed in claim 20 wherein a plurality of said styluses are provided, each stylus being associated with a different number of respective light guides connecting the stylus with said light source, each light guide having a respective magneto-optic light switching module associated therewith.

22. The combination as claimed in claim 15 wherein a plurality of said styluses are provided in an arrangement of at least one row, said photoconductor means and said electrode being connected in common to all of said styluses, said electrode being transparent to the light from said light source.

23. The combination as claimed in claim 22 wherein said photoconductor means comprises a layer to which said plurality of styluses are connected.

24. The combination as claimed in claim 15 wherein the printing image carrier comprises a ferroelectric layer.

25. The combination as claimed in claim 15 wherein said photoconductor means and said electrode are in the form of layers between said stylus and said light source.

* * * * *